United States Patent

[11] 3,539,067

| [72] | Inventors | David Secrist |
| | | Lee Livestock, Waysack, Elko, Nev., and |
| | | Robert Secrist, 390 Juniper St., Elko, |
| | | Nevada 89801 |
| [21] | Appl. No. | 731,840 |
| [22] | Filed | May 24, 1968 |
| [45] | Patented | Nov. 10, 1970 |

[54] VEHICLE FOR LOADING AND UNLOADING BALES OF HAY AND LIKE ARTICLES
10 Claims, 10 Drawing Figs.

[52] U.S. Cl. .................................................. 214/512,
214/520, 214/83.26; 198/7, 198/126
[51] Int. Cl. ........................................................ B60p 1/02
[50] Field of Search............................................ 214/508,
509, 512, 519—522, 83.26; 198/7(BL), 89, 126

[56] References Cited
UNITED STATES PATENTS

| 2,370,427 | 2/1945 | Sherry............................ | 214/85 |
| 2,761,578 | 9/1956 | Brownlee et al. .............. | 214/522X |
| 3,051,340 | 8/1962 | Ely................................ | 214/512 |
| 3,145,865 | 8/1964 | Rogers........................... | 214/512 |
| 3,341,039 | 9/1967 | Cranage......................... | 214/83.26 |
| 3,385,456 | 5/1968 | Snider............................ | 214/522X |
| 2,258,988 | 10/1941 | Le Laurin...................... | 214/82 |
| 2,464,217 | 3/1949 | Dillingham.................... | 214/83.26 |
| 3,325,028 | 6/1967 | Kenning........................ | 214/520 |

FOREIGN PATENTS

| 305,298 | | Switzerland.................. | 214/520 |

*Primary Examiner*—Albert J. Makay
*Attorney*—Burns, Doane, Benedict, Swecker & Mathis ABSTRACT: A vehicle which is intended for loading and unloading bales of hay and the like. The vehicle includes a horizontal flat bed and a chassis with wheel means supporting the chassis for motion along the ground. Bales of hay are adapted to be picked up from and delivered to the ground by a pickup conveyor extending between the ground and one end of the chassis. The bales are transferred between the pickup conveyor and a bed conveyor mounted in the bed moving longitudinally thereof. The pickup conveyor may be moved to an inoperative position in which it is concealed within the bed. Additionally, the bed may be selectively raised to differing heights above the chassis to vary the height of the bed above the ground.

Patented Nov. 10, 1970

INVENTORS
DAVID SECRIST
ROBERT SECRIST

BY Burns, Doane, Benedict, Swecker & Mathis
ATTORNEYS

VEHICLE FOR LOADING AND UNLOADING BALES OF HAY AND LIKE ARTICLES

BACKGROUND OF THE INVENTION

This invention relates to a vehicle for loading and unloading bales of hay and like articles.

In farming, it is often necessary to perform operations of transporting bales of hay from storage to the fields and vice versa. Traditionally, this has been performed utilizing a vehicle, such as a farm truck, with movement of the bales between the truck and the ground being effected by the use of manual implements such as pitchforks and the like. However, operations performed in this manner are necessarily arduous and time consuming and there has therefore been at least one prior attempt to provide a vehicle for loading and unloading bales of hay, which is mechanized.

One such prior vehicle, exemplified by the disclosure of Cranage U.S. Pat. No. 3,341,039 comprises a steerable, motor-driven, four-wheel vehicle having a horizontal flat bed. Bales of hay may be delivered to and picked up from the ground by a pickup conveyor pivotally connected to a forward end of the bed extending downwardly to the ground. At its upper end the pickup conveyor transfers the bales to and from a bed conveyor extending lengthwise of the flat bed.

Although such prior device may be generally satisfactory, certain operational disadvantages may be anticipated under some operational conditions. For example with the structure described, the pickup conveyor remains projecting forward from the remainder of the vehicle even at times when the pickup conveyor is not in use. This may have the disadvantage of exposing the pickup conveyor in a very vulnerable position for collision damage with common farm obstructions such as cattle, farm posts and the like, at times when the vehicle is being driven at relatively fast speeds for transportation of the bales.

In addition, the projecting pickup conveyor increases the overall length of the vehicle and may thereby significantly reduce the maneuverability of the vehicle when it is within relatively enclosed areas such as a farm yard.

Another problem may sometimes arise when loading bales of hay onto and from high piles of stacked bales. Although in the prior vehicle described provision is made for elevating the pickup conveyor to an upwardly inclined position to effect such loading, this necessitates feeding each bale separately along the pickup conveyor and does not provide a capability for moving bales directly between the flat bed and the top of the stack of bales. This necessity to pass every bale via the pickup conveyor may seriously increase the total loading or unloading time as compared with that obtainable if bales could be moved directly between the vehicle bed and the stack of bales.

SUMMARY OF INVENTION

It is therefore a general object of the invention to provide a vehicle for loading and unloading bales of hay and the like which obviates or minimizes problems of the type previously noted.

It is a particular object of the invention to provide a vehicle for loading and unloading bales of hay utilizing a pickup conveyor projecting forwardly of the vehicle, wherein the pickup conveyor may be moved to an inoperative position concealed within the vehicle when not in use to reduce the vulnerability of the conveyor and to reduce the overall vehicle length.

It is yet another object of the invention to provide a vehicle of the type described for loading and unloading bales of hay and the like, in which the vehicle bed may be selectively moved to different heights above the ground to facilitate direct transfer of bales between the bed and an adjacent stack of bales.

A vehicle for loading and unloading bales of hay according to a preferred embodiment of the invention, is intended to accomplish at least some of the foregoing objects. The vehicle includes a longitudinally extending, horizontally disposed, upwardly facing, generally flat bed. Wheel means connected with the bed support it for motion along the ground. Bed conveyor means connected with the bed extend longitudinally from a point adjacent one longitudinal end of the bed. The bed conveyor means is adapted to move bales longitudinally of the bed. Pickup conveyor means is operatively connected with the bed adjacent the one end thereof. The pickup conveyor means in an operative position, is disposed in longitudinally aligned, conveying relation with the bed conveyor means extending longitudinally away from the bed at a selectively variable, vertical inclination thereto. In a particularly significant aspect of the invention, means are connected with the chassis and with the pickup conveyor means for moving the pickup conveyor means from the operative position to an inoperative position in which the pickup conveyor means is concealed within the chassis.

Thus, the pickup conveyor, when its use is not required, is moved to a less vulnerable, concealed position. At the same time, the overall length of the vehicle is reduced, thus increasing maneuverability of the vehicle in confined spaces.

In another significant aspect of the invention, the bed of the vehicle may be raised selectively to greater heights above the ground. For this purpose, the vehicle further includes a chassis connected with the wheel means, with the flat bed movably connected with the chassis. Selectively operable elevating means is connected between the chassis and the flat bed for raising the flat bed to an elevated position spaced an increased height above the chassis while maintaining the horizontal disposition of the flat bed.

THE DRAWINGS

A vehicle for loading and unloading bales of hay and like articles constructed in accordance with one preferred embodiment of the invention is illustrated in the accompanying drawings in which.

DETAILED DESCRIPTION

1. General Summary

Figures 1, 2:
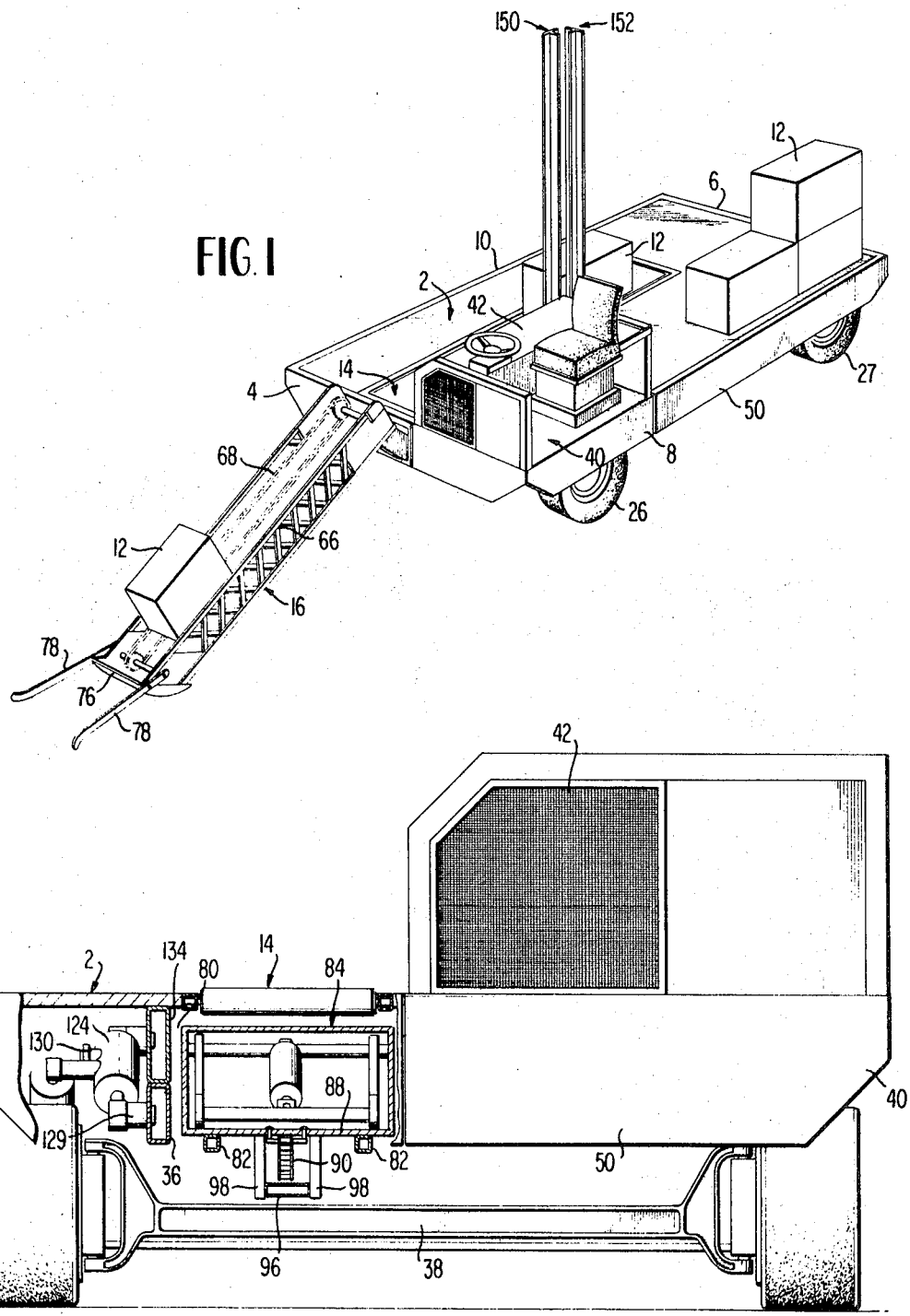
FIG. 1 is a perspective view of a vehicle according to the preferred embodiment of the invention.
FIG. 2 is a front end view of the vehicle shown in FIG. 1, shown in partial cross section.

Referring to FIG. 1 of the drawings, a vehicle for loading and unloading bales of hay, constructed in accordance with a preferred embodiment of the invention, is there shown.

The vehicle includes a horizontal, upwardly facing flat bed 2 having forward and rear ends 4 and 6, and left and right sides 8 and 10, respectively. Generally rectangular, conventional bales 12 of hay may be stacked upon the bed 2 of the vehicle. The bales are moved lengthwise of the bed 2 by a bed conveyor 14 operable in forward and reverse directions, extending lengthwise of the bed from a point adjacent the forward end 4 thereof. Bales are fed to and from the bed conveyor 14 by a pickup conveyor 16 aligned longitudinally with the bed conveyor and extending forwardly away from the vehicle.

In a particular feature of the invention, the pickup conveyor may be moved from its extended, operative condition (FIG. 3) to an inoperative position in which it is housed in a chamber 20 (FIG. 4) extending longitudinally inwardly of the vehicle beneath the bed conveyor 14. This permits the pickup conveyor 16 when it is not in use (such as during periods of transporting the bales at more rapid speed across the fields or along the roads or around farm buildings) to be removed from its forwardly projecting position, thus reducing its vulnerability and exposure to accidental collision damage. In addition, the overall length of the vehicle is reduced, thus increasing maneuverability of the vehicle in relatively confined areas such as, for example, a farm yard.

Figure 8:
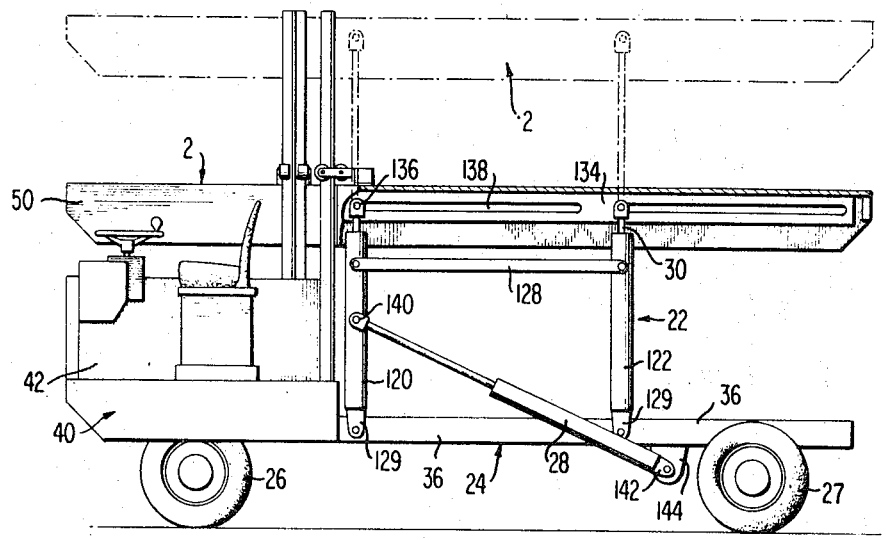
FIG. 8 is a side view, partially in cross section, of an elevating mechanism forming a part of the vehicle with the elevating mechanism shown in a raised condition.
Figure 9:
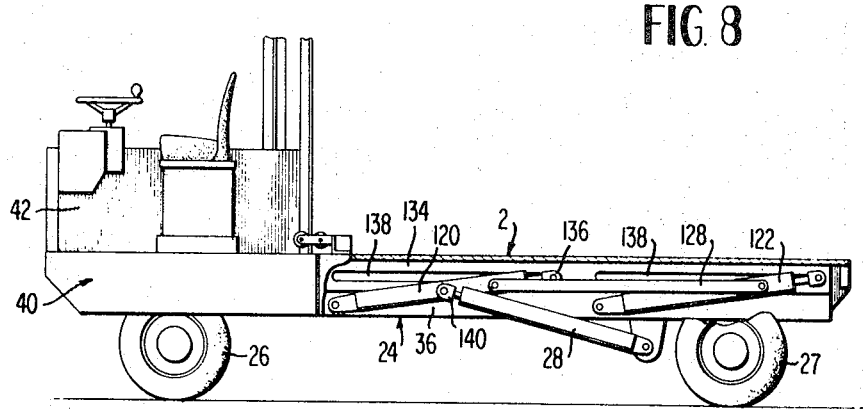
FIG. 9 is a side view, partially in cross section, of the vehicle shown in FIG. 8 but with the elevating mechanism shown in a lowered condition.

In another significant aspect of the invention, the aforementioned vehicle bed 2 may be raised to different heights above the ground (FIGS. 8 and 9). This is achieved by interposing a parallel linkage 22 between the truck bed 2 and a conventional vehicle chassis 24 connected with pairs of forward and rear wheels 26 and 27 of the vehicle. A pair of forwardly and upwardly inclined elevating jacks 28 positioned on opposite sides of the vehicle extend between the chassis and the parallel linkage 22. When the jacks 28 are extended, the parallel linkage is pivoted about its lower points of connection to a suspension system to a raised position in which the truck bed 2 is supported at a greater height above the suspension system 24. The bed may be raised still higher by the action of jack pistons 30 connected between the bed 2 and the parallel linkage 22. Retraction of the elevating cylinders 28 rotates the parallel linkage 22 downwardly to lower the flat bed 2 back into contact with the suspension system (FIG. 9).

It will be appreciated that the elevating structure described enables the bed to be moved vertically so that it may be placed on the level with the uppermost bales in a stack thereof when it is desired to effect transfer of bales between the bed of the truck and the upper bales in the stack. Thereafter, such transfer of bales may be effected by direct sideward movement of stacked bales between the bed and the stack, and vice versa, without requiring each bale to be separately passed along the pickup conveyor 16 for this purpose.

2. Detailed Structure

Figure 10:
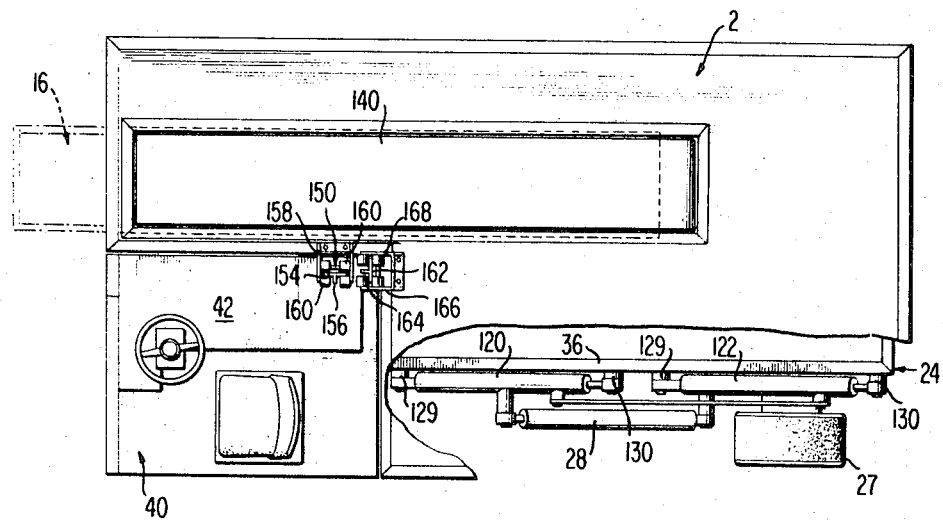
FIG. 10 is a top view, partially in cross section, of the vehicle shown in FIG. 9.

The previously mentioned chassis 24 includes longitudinally extending, horizontal, lower box girders 36 (FIGS. 2 and 10) spaced transversely and symmetrically on opposite sides of the longitudinal centerline of the vehicle. Also included as a part of the chassis 24 are longitudinally spaced, transversely extending forward and rear, independently steerable axles 38 (FIG. 2) supporting the previously mentioned forward and rear pairs of wheels 26 and 27, respectively.

Adjacent the left forward corner of the vehicle, there is provided a rectangular services area 40 (FIGS. 1 and 8) fixedly connected with and forming a part of the chassis 24. The services area 40 is provided with a conventional vehicle diesel engine 42 connected via a four-wheel drive (not shown) to the wheels 26 and 27. Also provided in the services area 40 are conventional vehicle engine and steering controls and a forwardly facing operator's driving station. Additionally, the vehicle engine 42 also drives a conventional hydraulic pump (not shown) used to provide a source of hydraulic power for various hydraulic services to be described hereinafter.

The previously mentioned flat bed 2 adjacent the forward, left end of the vehicle includes a rectangular cutout portion extending about the previously mentioned services area 40, so that the services area 40 remains in its fixed relation to the remainder of the chassis 24 during the period that the bed 2 is raised and lowered relative to the chassis. A downwardly extending skirt 50 is secured about the peripheral edges of the bed 2 extending downwardly therefrom. Suitable bracing members (not shown) are secured to the underside of the bed 2 to maintain its rigidity and flatness under load.

Figure 4:
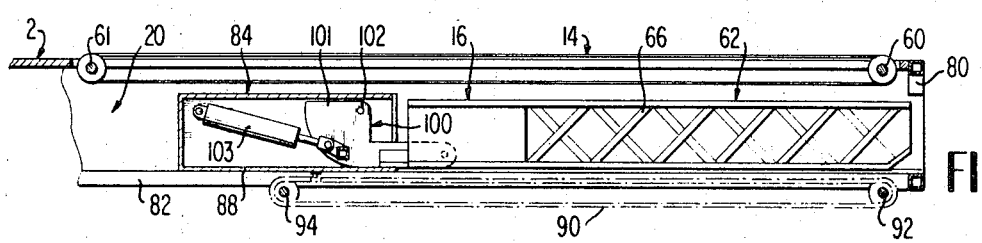
FIG. 4 is a cross-sectional side view of the portion of the apparatus shown in FIG. 3 but with the pickup conveyor shown retracted into an inoperative position concealed within the vehicle.

The bed conveyor 14 (FIG. 2) has a flat, longitudinally extending, upper surface generally coplanar with the upper surface of the bed 2. The bed conveyor 14 is a conventional, endless, flexible conveyor passing over forward and rear rolls 60 and 61 (FIG. 4). A reversible hydraulic motor (not shown) powered by the engine hydraulic system is drivingly connected with the roll 61 for selective driving of the upper surface of the conveyor 14 in forward and reverse directions. Longitudinally, the bed conveyor extends for about three-quarters of the length of the bed from a point closely adjacent the forward end 4 of the bed 2. Transversely, the bed conveyor 14 extends from a point adjacent the longitudinal centerline of the bed 2 to the right, for a little more than the width of an average conventional bale of hay.

The remaining surface area of the flat bed 2 not occupied by the conveyor 14 is used for stacking the bales once they have been moved off the bed conveyor. In operation, one person drives the vehicle across the field during pickup and unloading operation while another person stands on the bed 2 to manually move bales between the bed conveyor 14 and the bed 2.

The previously mentioned pickup conveyor 16 includes a rigid supporting ramp 62 having a longitudinally and transversely extending flat bottom plate 64. Spaced opposed longitudinally extending sidewalls 66 (FIGS. 4 and 5) extend upwardly from the opposite transverse edges of the bottom 64.

Two transversely spaced, opposed, longitudinally extending chain conveyors 68 (FIG. 3) are positioned within the ramp 62 between the sidewalls 66. The chain conveyors pass over upper and lower, transversely extending sprocket shafts 70 and 72, respectively, and are selectively driven in forward and reverse directions by a reversible hydraulic motor 74 connected with the engine-driven hydraulic system. The chain conveyors 68 include upper surfaces parallel to the base member 64, spaced below the upper edges of the sidewalls 66.

At the lower end of the ramp 62 there is provided an upwardly and forwardly extending transverse lip 76 (FIG. 1) positioned between two transversely spaced, opposed, forwardly directed fingers 78. When picking up a bale from the field, the vehicle is driven in general alignment towards a bale. The bale is contacted on its opposite sides by the fingers 78 and guided thereby onto the lip 76. The lip 76 tips up the leading edge of the bale so that continued forward motion of the vehicle moves the bale onto the upper surface of the conveyor chains 68. By arranging the hydraulic motors controlling the operation of the conveyor chains and the bed conveyor to turn in an appropriate direction, the upper surfaces of both conveyors may be caused to be moving rearwardly so that the bale is carried up the pickup conveyor, transferred to the bed conveyor and carried lengthwise along the bed. It is then moved sidewardly off the conveyor by the operator and stacked on the bed of the vehicle.

Conversely on unloading, the bed conveyor and conveyor chains 68 are caused to move in the reverse direction.

Additionally, while the bale is passing up the conveyor chains, it is prevented from moving sidewardly off the pickup conveyor by the portions of the sidewalls 66 projecting above the conveyor chains 68.

Figure 3:
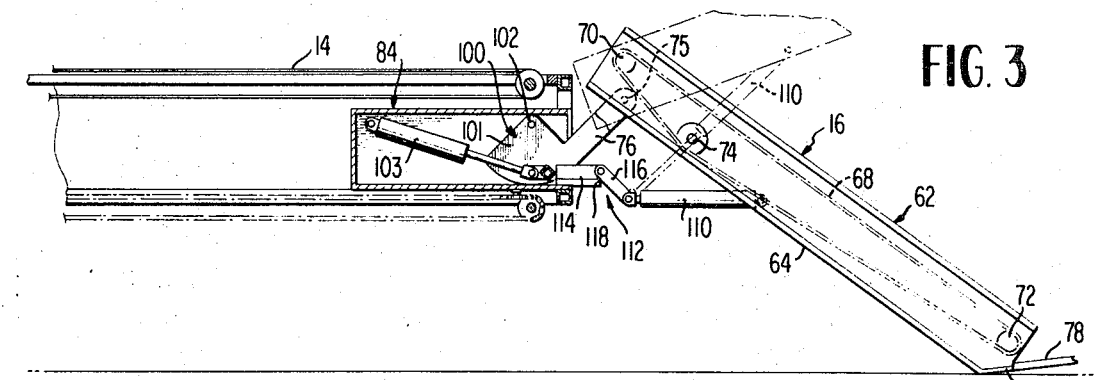
FIG. 3 is a cross-sectional side view of a forward end portion of the vehicle shown in FIG. 1 with a pickup conveyor forming a part of the invention shown in an operative, ground-contacting position.

It will be appreciated that to effect transfer of the bales between the pickup conveyor 16 and the bed conveyor 14, it is necessary that the upper surface of the conveyor chains 68 at the upper end thereof be positioned on a level generally equal to that of the upper surface of the bed conveyor 14. In the preferred embodiment (as shown in FIG. 3) the upper surface of the conveyor chain 68 at the upper end thereof is positioned a short distance vertically above the upper surface of the bed conveyor 14, however, this may be varied somewhat if desired.

To support the upper end of the pickup conveyor when it is in use in the above described relation to the bed conveyor 14, the ramp 62 adjacent its upper end is connected at pivot points 75 with two transversely spaced opposed support arms 76 for motion about a horizontal transverse pivot axis. The arms 76 form part of a retracting mechanism to be described.

In order to permit the pickup conveyor 16 to be stowed in a concealed position within the vehicle at times when the use of the pickup conveyor is not required, the previously mentioned chamber 20 is provided. The chamber 20 comprises a longitudinally extending open space beneath the previously mentioned bed conveyor 14 with a generally rectangular forward opening 80 (FIGS. 2 and 4) provided in the portion of the skirt 50 adjacent the bed conveyor 14. Spaced beneath the conveyor 14 are a pair of transversely spaced, opposed, longitudinally extending tracks 82 connected at their opposite ends with other portions of the skirt 50. The tracks 82 are disposed symmetrically beneath the bed conveyor 14.

Supported on the tracks 82 for longitudinal motion beneath the bed conveyor 14 is a support housing 84. The support housing 84 (FIG. 4) comprises a generally rectangular box having vertically spaced, opposed, upper and lower horizontal walls 86 and 88, respectively, and vertically extending, left and right sidewalls 90 and 92 (FIG. 5), respectively. The lower horizontal wall 88 rests generally centrally on and across the tracks 82 for longitudinal sliding motion therealong, and the upper wall 86 is spaced beneath the bed conveyor 14.

The support housing 84 may be moved between an extreme advanced position adjacent the forward end of the bed conveyor 14 (FIG. 3) and an extreme retracted position adjacent the rearward end of the bed conveyor 14 (FIG. 4), by a longitudinally extending, endless chain 90 positioned beneath and centrally of the tracks 82 (FIG. 2). The chain 90 runs between forward and rear drive sprockets 92 and 94 (FIG. 4) connected to adjacent portions of the bed structure. The sprocket 94 may be selectively driven in forward and reverse directions by a hydraulic motor (not shown) supplied with hydraulic fluid from the engine-driven, hydraulic system. At a fixed point on the upper surface of the chain 90 there is a connection to the underside of the lower wall 88 of the support housing 84. As the upper surface of the chain 90 is selectively driven in forward and reverse directions the support housing 84 is correspondingly moved between its extreme forward and rear positions.

To prevent transverse movement of the support housing 84 on the tracks 82, a longitudinally extending, rectangular cross section, guide bar 96 secured to adjacent portions of the bed structure, is mounted beneath the conveyor chain 90. The guide bar 96 is slidably contacted on its opposite transverse sides by depending guide plates 98 secured to the lower wall 88 of the support housing 84 to maintain the support housing in transversely centralized relation beneath the bed conveyor 14.

The support housing 84 is connected at its forward end with the upper, rearward end of the previously mentioned pickup conveyor 16, by the previously mentioned support arms 76 (FIG. 3). The support arms 76 each form an integral part of two transversely spaced, opposed pivot members 100 extending into the support housing 84, positioned on opposite sides thereof. Each pivot member includes a quadrantally shaped, arcuate segment 101 pivotally connected by a pivot connection 102 adjacent its apex to the adjacent one of the sidewalls 90 and 92 adjacent the forward upper extremities thereof. The pivot members 100 pivot about concentric, horizontal, transversely extending pivot axes. The support arm portion 76 of each pivot member 100 extends forwardly and tangentially from the lower forward surface of the segmental portion 101 of each pivot arm.

The pivot members 100 may be pivoted concurrently to an extreme raised position (FIG. 3) in which the associated support arms 76 are inclined upwardly and outwardly of the support housing 84 to support the upper end of the pickup conveyor 16 in the previously described relation to the bed conveyor 14. The pivot members 100 (FIG. also be swung concurrently to an extreme lowered position (FIG. 4) in which the lower edge of each associated support arm 76 is aligned generally in the same horizontal plane as the upper surface of the lower wall 88 of the support housing 84.

Figure 5:
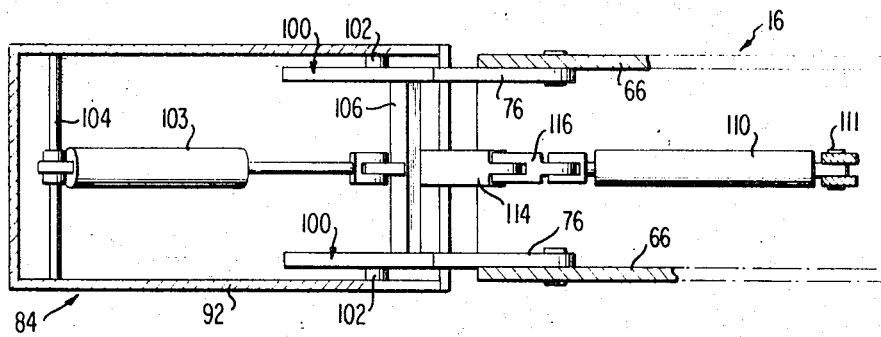
FIG. 5 is a top view, partially in cross section, of a portion of the pickup conveyor and an adjacent support housing having a housing jack therein shown in an extended position.
Figure 6:
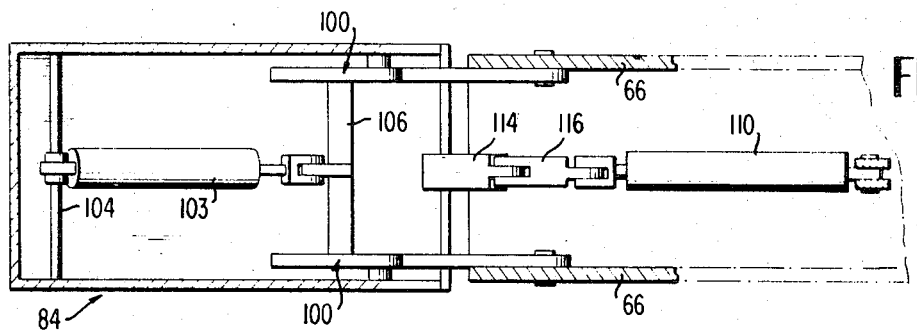
FIG. 6 is a cross-sectional top view of the portion of the vehicle shown in FIG. 5 but with the housing jack shown in a retracted condition.

Motion of the pivot members 100 between the extreme raised and lowered positions is effected by a housing jack 103 positioned within and extending along the longitudinal centerline of the support housing 84 (FIGS. 4, 5 and 6). The housing jack 103 is a conventional hydraulic jack adapted to be extended and retracted by hydraulic supply (not shown) from the engine-driven, hydraulic system. The cylinder end of the jack 103 is connected for motion about a horizontal transverse axis to a rear transverse shaft 104 extending between the sidewalls 90 and 92 adjacent the rear upper ends thereof. The piston end of the housing jack 103 is pivotally connected to a forward transverse shaft 106 fixedly connected to and extending transversely between the pivot members 100 adjacent the lower extremities thereof. Extension and retraction of the housing jack 103 causes pivotal motion of the pivot members 100 between the raised and lowered positions thereof, respectively.

The inclination of the previously mentioned pickup conveyor 16 to the vertical may be selectively varied by the extension and retraction of an inclination hydraulic jack 110 (FIG. 3) aligned with the longitudinal axis of the pickup conveyor 14. The inclination jack 110 is a conventional hydraulic jack adapted to be selectively extended and retracted by connection to the engine-driven, hydraulic system. The cylinder end of the hydraulic jack 110 is connected by a pivot connection 111 to the underside of the ramp 62 for pivotal motion about a transverse axis spaced forwardly of the point of pivotal connection of the ramp 62 to the support arms 76. The rearward, piston end of the inclination jack 110 is connected via a linkage 112 to the forward end of the lower wall 88 of the support housing 84. When the inclination jack 110 is in a retracted position with the support arms 76 in the raised position, the ramp 62 has its lower end touching the ground. However, selective extension of the inclination jack 110 causes the ramp to be rotated upwardly about its points of pivotal connection to the support arms 76, as shown by the dotted line, raised position in FIG. 3.

Figure 7:
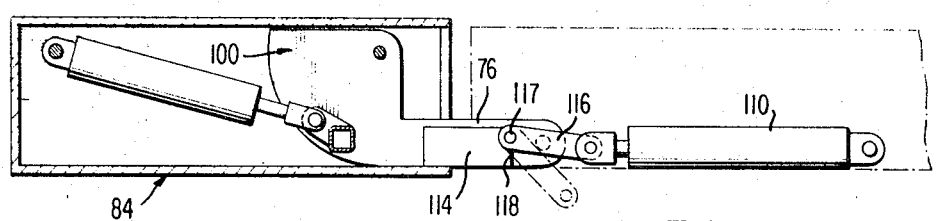
FIG. 7 is a side view, partially in cross section, of a portion of the apparatus shown in FIG. 4 but on an enlarged scale.

The linkage 112 includes a first link 114 fixedly secured to the forward end of the lower wall 88 of the support housing projecting forwardly outwardly thereof. A second link 116 is connected by a pivot connection 117 (FIG. 7) to the forward end of the first link for pivotal motion about a horizontal transverse pivot axis. The forward end of the second link 116 is pivotally connected to the piston end of the inclination jack 110. A transversely extending abutment shoulder 118 on the first link 114 positioned below and forwardly of the pivot connection 117 limits downward pivoting motion of the link 116 about its point of transverse pivotal connection to the first link 114. Once the link 116 has moved down into abutting contact with the shoulder 118, further downward movement of the link 116 is prevented so that extension of the inclination jack 110 thereafter causes upward movement of the ramp with reference to the now fixed lower end of the link 116.

In moving the pickup conveyor 16 to its inoperative position, the inclination jack 110 is retracted to its shortest overall length. The housing jack 102 is then retracted to move the support arms 76 downwardly to their lowered position. At this time, with both the jacks 102 and 110 retracted, the geometry of the various jacks and support arm connections is such that the ramp 62 is disposed horizontally, projecting longitudinally forwardly from the vehicle with the underside of the bottom wall 64 of the ramp 62 generally on the level or slightly above the lower wall 88 of the support housing. The conveyor chain 90 is then selectively driven to move its upper surface in a rearward direction to withdraw the support housing 84 and the pickup conveyor 16 rearwardly entirely into the chamber 20. At its forward end the underside of the pickup conveyor rests upon and is supported by the upper side of the previously mentioned tracks 82.

It will be appreciated that many significant advantages are provided by the retraction mechanism which permits the pickup conveyor to be withdrawn within the vehicle when its use is not required. For example, the pickup conveyor, when retracted, cannot come into accidental collision with obstructions commonly found in a farm environment such as, for example, cattle, farm gate posts and the like, while the vehicle is being driven. In addition, bouncing cantilever loads imposed on the pickup conveyor as the vehicle passes over bumps and ruts are eliminated. Significantly, the overall length of the vehicle is reduced so that the maneuverability of the vehicle within relatively constricted areas such as a farm yard is enhanced.

As initially discussed, the bed 2 may be raised vertically to different heights above the ground to enable bales to be transferred directly between the bed and the upper portions of a stack of bales.

The previously mentioned elevating linkage 22 provided for this purpose includes forward and rear, left-side jacks 120 and 122, respectively, (FIG. 8) positioned on the left side of the vehicle and forward and rear right side jacks 124 and 126, respectively, (FIG. 2, the jack 126 is hidden, however) positioned on the right-side of the vehicle. The jacks 120, 122, 124, 126 are all of the same construction and have the lower ends of the cylinder portions of the jacks connected by pivot connections 129 to the outwardly facing, vertical sides of the previously mentioned lower box girders 36 (FIGS. 2 and 8) forming part of the chassis 24. The right and left, forward jacks 120 and 124 are positioned in transverse alignment closely behind the services area 40 for pivotal motion about a horizontal, forward pivot axis extending transversely of the chassis 24. Similarly, the right and left, rear jacks 122 and 126 are positioned in transverse alignment with each other, spaced rearwardly of the forward jacks for pivotal motion about a horizontal, rear pivot axis extending transversely of the chassis 24. The forward and rearward pivot axes, it will be understood, are longitudinally spaced in symmetrical disposition on opposite sides of the transverse centerline of the flat bed so that the jacks provide equally distributed support for the bed.

The cylinder portions of the left-side jacks 120 and 122 are maintained in parallel relation by a left-side link 128 (FIG. 8) pivotally connected at its opposite longitudinal ends to the cylinder portions of the jacks 120 and 122 adjacent the upper ends thereof, with the link 128 being disposed generally parallel to the adjacent lower box girder 36. A similar, right-side link 130 (FIG. 2) connecting the cylinder portions of the right-side jacks 124 and 126 to maintain them in parallel relation, is also provided.

It will be understood that the right-side jacks 120, 122 together with the right link 128, and the left-side jacks 124, 126 together with the left link 130, constitute the previously mentioned parallel linkage 22 interposed between the bed 2 and the chassis 24.

Fixedly secured to the underneath of the flat bed 2 are two, transversely spaced, opposed longitudinally extending, upper box girders 134 disposed in vertical alignment above the previously mentioned lower box girders 36. When the bed 2 of the vehicle is in its normal lowered position during transportation and during the picking up of bales from the fields, the upper box girders 134 rest in abutting contact on the upper surfaces of the lower box girders 36 (FIG. 2) to support the bed 2 on the chassis 24. However, the upper box girders 134 also provide an attachment point for the upper ends of the parallel linkage 22 to permit the bed to be raised.

For this purpose, each of the previously mentioned jacks 120, 122, 124 and 126 at the upper end of the piston portion of each of these jacks, is provided with a transversely extending pin connection 136. Each pin 136 is slidably and snuggly received within one of four longitudinally extending, closed slots 138 positioned on the outwardly facing sides of the two upper girders 134 adjacent the upper ends of the jacks.

The parallel linkage 22 is moved between its lowered and raised positions by the previously mentioned elevating jacks 28 positioned one each on opposite sides of the chassis 24.

Each of the elevating jacks 28, which are conventional hydraulic jacks, has the piston end of the jack connected by a pivot connection 140 to the adjacent one of the forward jacks 120 and 124 adjacent the vertical midpoints thereof for pivotal motion about a horizontal, transverse pivot axis. The lower cylinder end of each of the elevating jacks 28 is pivotally connected by a pivot connection 142 transverse to one of two brackets 144 for pivotal motion about a horizontal, transverse pivot axis. The brackets 144 are spaced on opposite sides of the chassis 24 secured to the underside of the adjacent box girders 36 and are positioned rearwardly of the adjacent rear jacks 122 and 126.

When the jacks 120, 122, 124 and 126 and the elevating jacks 28 are all retracted, as shown in FIG. 9, the bed 2 occupies its lowered position with the upper girders 134 supporting the bed 2 on the lower girders 36 of the chassis 24.

As the elevating jacks 28 are extended, the jacks 120, 122, 124 and 126 constituting the parallel linkage are rotated upwardly and forwardly about their lower pivotal points of connection to the lower box girders 36 of the chassis. As the upper ends of the jacks are correspondingly moved upward and forwardly, the bed 2 is raised above the chassis 24. However, as the bed 2 is prevented from moving forwardly (as will be described) the pins 136 slide forwardly in their associated slots 138. Eventually, the elevating jacks 28 reach a fully extended position, (FIG. 8) at which time the jacks 120, 122, 124 and 126 extend vertically upwardly with the bed 2 spaced above and parallel to the chassis.

The bed 2 may thereafter be raised to an even higher elevation, shown by the dotted lines in FIG. 8, by extension of the piston portions of the various jacks 120, 122, 124 and 126.

Lowering of the bed 2 to its initial position takes place in reverse sequence to that just described.

It will be appreciated that the bed-raising structure described offers significant advantages in performing operations involving the transfer of bales directly between the vehicle bed and upper portions of adjacent stacks of the bales. By moving the bed upwardly under the action of the jacks 28 and jacks 120, 122, 124 and 126 to a level equal to that of the upper bales in a stack of bales next to the vehicle, it is possible for the operator standing on the bed 2 to move bales directly between the bed and the stack by transverse motion across the edge of the bed. This capability greatly reduces the time needed to be spent in transferring bales between the vehicle and a stack of bales.

Additionally, the capability for moving the bed to different heights, enables the vehicle to be used for many other agricultural purposes such as fruit picking, hedge trimming and the like where a variable elevation device is of particular utility.

To maintain the stability of the vehicle it is, of course, necessary to avoid longitudinal or transverse changes in the location of the bed relative to the chassis during elevation and lowering of the bed. For this purpose, two vertically extending T-section pillars 150 and 152 (FIG. 1) are fixedly secured to the service area 40 adjacent the rear left corner thereof extending vertically upwardly.

The pillar 150 (FIG. 10) includes a flange 154 extending in a direction longitudinally of the vehicle, with an integral strengthening web 156 positioned centrally of the flange 154 extending transversely to the left. Secured to adjacent portions of the bed 2 is a frame 158 supporting two opposed pairs of rollers 160 rollingly contacting opposite sides of the flange 154, to prevent transverse motion of the flat bed 2 relative to the pillar 150.

Similarly, the pillar 152 includes a flange 162 aligned transversely of the vehicle, with an integral strengthening web 164 positioned centrally of the flange 162 extending in a forward longitudinal direction. A frame 166 fixedly connected with adjacent portions of the flat bed 2 supports two pairs of rollers 168 rollingly contacting opposite sides of the flange 162, to prevent longitudinal motion of the bed 2 relative to the pillar 152.

It will be appreciated that the pillars 150 and 152 thus prevent transverse and longitudinal translation, respectively, of the bed 2 with respect to the underlying chassis 24 during vertical motion of the bed.

SUMMARY OF ADVANTAGES

It will be appreciated that in constructing a vehicle for loading and unloading the bales of hay, according to the present invention, certain significant advantages are provided.

In particular, the retraction mechanism provided for the pickup conveyor enables it to be moved to a position where it is less vulnerable to collision damage when the pickup conveyor is not in use. Retraction of the pickup conveyor in this manner has the additional important advantages of reducing the overall length of the vehicle to increase vehicle maneuverability, and of reducing the bounce loads imposed on the conveyor when the vehicle passes at speed over ruts and the like.

Other very significant advantages are provided by the elevating mechanism which enables the bed of the vehicle to be selectively raised and lowered. In this way the bed may be moved to a level with the upper bales in a stack of bales, so that bales may thereafter be transferred directly between the bed and the stack by sideward motion across the edge of the bed. This offers valuable time savings and increased convenience for the operator.

Although the invention has been described with reference to one preferred embodiment, it will be appreciated that numerous additions, deletions, modifications, substitutions and other changes not specially disclosed or described may be made that will fall within the purview of the appended claims.

We claim:

1. A vehicle for loading and unloading bales of hay and the like, said vehicle comprising:
    a longitudinally extending, horizontally disposed, upwardly facing, generally flat bed;
    wheel means connected with said bed supporting said bed for motion along the ground;
    bed conveyor means connected with said bed extending longitudinally from a point adjacent one longitudinal end thereof, said bed conveyor means adapted to move bales longitudinally of said bed;
    pickup conveyor means operatively connected with said chassis adjacent said one end, said pickup conveyor means in an operative position thereof being in longitudinally aligned, conveying relation with said bed conveyor means extending longitudinally away from said chassis at a selectively variable vertical inclination thereto;
    means connected with said bed and with said pickup conveyor means for moving said pickup conveyor means from the operative position thereof to an inoperative position in which said pickup conveyor means is concealed within said bed;
    said pickup conveyor means further including:
    a longitudinally extending supporting ramp;
    an endless pickup conveyor mounted on and extending longitudinally of said ramp; and
    wherein said means for moving said pickup conveyor means to the inoperative position further includes:
    a generally horizontal chamber in said bed extending longitudinally inwardly thereof;
    a housing movably mounted in said chamber for motion therealong;
    pivot means pivotally connecting said housing with one longitudinal end of said ramp; and
    housing moving means connected with said bed and with said housing for movement of said housing longitudinally of said chamber between an extended position in which said pivot means extends outwardly of said chamber to support said pickup conveyor in the operative position thereof and a retracted position in which said housing and said ramp are positioned within said chamber.

2. A vehicle as defined in claim 1 wherein said pivot means further includes:
    at least one bell crank member pivotally connected with said housing for motion about a horizontal, bell crank pivot axis extending transversely of said housing adjacent one end thereof, said bell crank rotatable about said bell crank pivot axis between extreme up and down positions, said bell crank further including:
    a first pivotal connection point pivotally connected with said one end of said ramp for motion thereof about a horizontal transverse axis, said first connection point in the up position of said bell crank member being positioned outwardly of said housing and spaced above said bell crank pivot axis to place adjacent upper surface portions of said pickup conveyor generally on a level with adjacent upper surface portions of said bed conveyor means, said first connection point in the down position of said bell crank being positioned within said housing spaced below said bell crank pivot axis;
    a second connection point spaced longitudinally from said first connection point on an opposite side from said bell crank pivot axis; and
    first extensible jack means connected between said second connection point and other portions of said housing, selective extension and retraction of said first jack means causing said bell crank member to be selectively rotated between said up-and-down positions.

3. A vehicle as defined in claim 2 further including:
    second extensible jack means pivotally connected at one end thereof on the underside of said ramp; and
    linkage means for connecting an opposite end of said second extensible jack means of said housing adjacent said one end thereof, said second jack means upon extension and retraction thereof causing progressive upward and downward inclination, respectively of said ramp, said linkage means, said second jack means and the underside of said ramp upon movement of said bell crank member to the down position being moved generally into horizontal alignment with corresponding lower surface of said chamber thereof to permit said ramp to be withdrawn into said chamber by said housing moving means.

4. A vehicle as defined in claim 3 wherein said housing moving means further includes:
    a longitudinally extending endless flexible member extending along and beneath said chamber;
    reversible motor means for driving said endless flexible member to move an upper surface thereof in forward and reverse directions; and
    connecting means connecting said housing with a point on said upper surface of said endless flexible member to cause longitudinal movement of said housing along said chamber upon corresponding movement of said endless flexible member.

5. A vehicle for loading and unloading bales of hay and the like, said vehicle comprising:
    a longitudinally extending chassis;
    a horizontally disposed upwardly facing, generally flat bed above and closely adjacent said chassis;
    wheel means connected with said chassis supporting said chassis for motion along the ground;
    bed conveyor means connected with said bed extending longitudinally from a point adjacent one longitudinal end thereof, said bed conveyor means adapted to move bales longitudinally of said bed;
    pickup conveyor means operatively connected with said flat bed adjacent said one end of said pickup conveyor means, said pickup conveyor means in an operative position thereof being in longitudinally aligned, conveying relation with said bed conveyor means extending away therefrom at a selectively variable vertical inclination;
    means connected with said bed and with said pickup conveyor means for moving said pickup conveyor means from the operative position thereof to an inoperative position in which said pickup conveyor means is concealed within said bed; and selectively operable elevating means connected between said flat bed and said chassis for raising said bed to an elevated position spaced above said chassis while maintaining the horizontal disposition of said bed.

6. A vehicle as defined in claim 5 wherein said pickup conveyor means further includes:

a longitudinally extending supporting ramp;

an endless pickup conveyor mounted on and extending longitudinally of said ramp; and wherein said means for moving said pickup conveyor means to the inoperative position further includes:

a generally horizontal chamber in said bed extending longitudinally inwardly thereof;

a housing movably mounted in said chamber for longitudinal motion therealong;

pivot means pivotally connecting said housing with one longitudinal end of said ramp;

housing moving means connected with said bed and with said housing for movement of said housing longitudinally of said chamber between an extended position in which said pivot means extends outwardly of said chamber to support said pickup conveyor in the operative position thereof and a retracted position in which said housing and said ramp are positioned within said chamber; and wherein said elevating means further includes:

parallel linkage means connected between said chassis and said bed for supporting said bed at selectively variable heights above said chassis;

extensible jack means connected between said parallel linkage means and said chassis, said jack means upon extension thereof causing said parallel linkage means to raise said flat bed upwardly relative to said chassis, said jack means upon retraction thereof causing said parallel linkage means to lower said flat bed into resting contact against said chassis; and vertically extending pillar means connected with said chassis extending slidably through said bed for preventing longitudinal motion of said bed relative to said chassis during relative vertical motion.

7. A vehicle for loading bales of hay and the like, said vehicle comprising:

a longitudinally extending axis;

a horizontally disposed, upwardly facing, generally flat bed for simultaneously supporting thereupon a plurality of bales above said chassis;

wheel means connected with said chassis supporting said chassis for motion along the ground;

bed conveyor means connected with said bed extending longitudinally from a point adjacent one longitudinal end thereof, said bed conveyor means being adapted to move the bales longitudinally of said bed;

pickup conveyor means operatively connected with said flat bed adjacent said one end of said pickup conveyor means in an operative position thereof being in longitudinal alignment, conveying relation with said bed conveyor means extending away from said bed at a selectively variable vertical inclination; and selectively operable, elevating means connected between said chassis and said bed for raising said bed to an elevated position spaced above said chassis while maintaining the horizontal disposition of said flat bed including:

parallel linkage means connected between said chassis and said bed for supporting said bed at selectively variable heights above said chassis;

extensible jack means connected between said parallel linkage means and said chassis, said jack means upon extension thereof causing said parallel linkage means to raise said flat bed relative to said chassis, said jack means upon retraction thereof causing said parallel linkage means to lower said flat bed relative to said chassis;

retaining means pivotally connected between said parallel linkage means for maintaining the parallel relationship between said linkage means during actuation of said extensible jack means; and vertically extending pillar means connected with said chassis extending slidably through said bed for preventing longitudinal motion of said bed relative to said chassis during relative vertical motion.

8. A vehicle as defined in claim 7 further including means connected with said parallel linkage means for causing linear vertical extension of said parallel linkage means to cause additional elevation of said bed subsequent to extension of said elevating jack means.

9. A vehicle as defined in claim 7 wherein said parallel linkage means further includes:

a first pair of transversely spaced opposed coextensive links positioned on opposite transverse sides of said chassis, said links at the lower ends thereof being pivotally connected with said chassis for pivotal motion about a horizontal, transverse, first pivot axis;

a second pair of transversely spaced opposed links coextensive with said first pair of links positioned on opposite transverse sides of said chassis, said links having the lower ends thereof pivotally connected with said chassis for pivotal motion about a horizontal transverse second pivot axis spaced longitudinally from said first pivot axis and coplanar therewith;

a third pair of transversely spaced links, said links in said third pair being pivotally connected between transversely adjacent said first and second links to maintain said links in parallel disposition; said third pair of links being disposed in a plane parallel to the plane of said first and second pivot axes;

a plurality of longitudinally extending, generally coplanar, horizontally disposed slots on opposite transverse sides of said bed, each said slot being positioned adjacent an upper end of an adjacent one of said links;

a plurality of sliding pins, each said pin being fixedly connected with the upper end of one of said links and snugly received in an adjacent one of said slots for horizontal, longitudinal sliding motion therealong; and wherein said jack means further includes:

a pair of extensible jacks positioned on opposite transverse sides of said suspension system extending generally diagonally between said chassis and the links in one of said first and second pairs, said jacks in the retracted position thereto placing said links in a downwardly collapsed position in which said bed is closely adjacent said suspension system, said jacks in an extended position moving said first and second pairs of links to a generally vertical position in which said flat bed is spaced a greater distance above said chassis.

10. A vehicle as defined in claim 9 wherein said first pair of links comprises a first pair of hydraulic jacks adapted for extension subsequent to motion to said vertical position to cause additional raising of said bed; and wherein said second pair of links comprises a second pair of hydraulic jacks adapted for extension concurrently with said first pair of hydraulic jacks.